United States Patent [19]

Hutchison et al.

[11] 3,890,358

[45] June 17, 1975

[54] POLYGLYCEROL PARTIAL ESTERS AND THEIR USE IN LIPSTICK FORMULATIONS

[75] Inventors: Robert B. Hutchison; Lee R. Mores, both of Cincinnati, Ohio

[73] Assignee: Emery Industries, Inc., Cincinnati, Ohio

[22] Filed: May 8, 1972

[21] Appl. No.: 251,367

[52] U.S. Cl................................ 260/410.6; 424/64
[51] Int. Cl.²................... C07C 69/33; A61K 7/027
[58] Field of Search ....... 424/64, DIG. 5; 260/410.6

[56] References Cited
UNITED STATES PATENTS

| | | | |
|---|---|---|---|
| 1,958,700 | 5/1934 | Harris | 8/6 |
| 3,335,053 | 8/1967 | Weitzel | 424/59 |
| 3,637,774 | 1/1972 | Babayan et al. | 260/410.6 |
| 3,745,033 | 7/1973 | Hutchison | 106/270 |
| R21,322 | 1/1940 | Harris | 260/410.6 |

OTHER PUBLICATIONS

Proserpio, Riv. Ital. Essenze, Profumi, Piante Off., Aromi, Saponi, Cosmet., Aerosol., 54(2), pp. 129–132, February, 1972.

*Primary Examiner*—Donald G. Daus
*Assistant Examiner*—Diana G. Rivers
*Attorney, Agent, or Firm*—Gerald A. Baracka; John D. Rice

[57] ABSTRACT

Partial esterification products of polyglycerols and branched chain fatty acids are useful in cosmetic lipsticks. The polyglycerol partial esters, particularly those derived from isostearic acid, are useful substitutes for all or part of the castor oil in the lipstick formulation.

5 Claims, No Drawings

POLYGLYCEROL PARTIAL ESTERS AND THEIR USE IN LIPSTICK FORMULATIONS

BACKGROUND OF THE INVENTION

The base formulation for typical lipstick compositions usually contains an oil which serves as a vehicle for the dye and is also employed to control the consistency of the lipstick. The oil generally comprises about 20 to 60% by weight of the lipstick. Numerous oils have been suggested for this purpose, however, castor oil has unique physical properties which make it more suitable for this purpose than other naturally occurring oils. No completely acceptable substitute for castor oil, natural or synthetic, has heretofore been available.

It would be highly advantageous if substitutes for castor oil could be obtained and if said materials possessed all the desirable features of castor oil and could be freely substituted for all or part of the castor oil in formulating lipsticks. It would be especially advantageous if these substitutes were not susceptible to rancidity which is one of the major drawbacks associated with the use of castor oil, since castor oil contains unsaturation being primarily comprised of triglycerides of ricinoleic acid. Synthetic oils would have the added advantage of being uniform from batch to batch, which is not always the case with castor oil.

SUMMARY OF THE INVENTION

Partial esters of polyglycerols have been prepared which are useful substitutes for castor oil in the formulation of lipsticks. The polyglycerol partial esters may be used to replace all or part of the castor oil in lipsticks and they are compatible with other known ingredients used in the preparation of lipstick compositions.

The polyglycerol partial esters of this invention are derived from polyglycerols containing from about two to about eight condensed glycerol molecules and brached chain monocarboxylic acids containing from about 12 to 22 carbon atoms. Compositions obtained by the partial esterification of polyglycerols containing about two to six condensed glycerol units with branched chain acids containing about 14 to 18 carbon atoms find particular utility. These polyglycerol partial esters have at least 40% unreacted hydroxyl groups. An especially useful partial ester of this invention is triglycerol diisostearate obtained by the reaction of 1 mol triglycerol and 2 mols isostearic acid.

DETAILED DESCRIPTION

The compositions of the present invention are partial esters of polyglycerols obtained by the reaction of branched chain saturated fatty acids with polyglycerols. These compounds have the general formula:

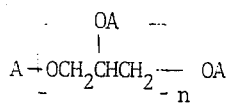

wherein $n$ is an integer from 2 to about 8 and A is hydrogen or an acyl radical of the formula

where R is a branched chain hydrocarbon radical containing about 11 to about 23 carbon atoms. In a preferred embodiment of this invention at least 40% of the functional groups are hydroxy groups, i.e., unesterified, $n$ is an integer from about 2 to 6 and R is a branched chain hydrocarbon radical containing from 13 to 17 carbon atoms. Polyglycerol partial esters derived from isostearic acid are especially preferred compositions of this invention.

The polyglycerol partial esters are obtained by the esterification reaction of polyglycerols and branched chain monobasic acids using reaction conditions known to the art. An esterification catalyst may be used but is not essential for conducting the reaction. The preparation of the partial esters may be monitored by measuring the amount of water formed or by measuring the acid value or hydroxyl value of the reaction product. These are wellknown procedures described in the art.

The degree of esterification will be varied according to the reactants employed and the properties desired in the polyglycerol ester product. As a general rule, however, the polyglycerols will have, on an average, at least 2 of the hydroxyl groups reacted with the acid. On the other hand, at least about 40% of the polyglycerol hydroxyl groups should remain unreacted. For example, partial esters of triglycerol (which contains 5 hydroxyl groups) will contain at least 2 but not more than 3 ester groups. The partial esters of hexaglycerol (8 hydroxyl groups) would, in accordance with the above definition, contain from 2 to about 4.8 ester groups on the average. Conversely, the hexaglycerol partial esters contain from about 6 to about 3.2 free hydroxyl groups. The position of the ester groups on the polyglycerol may vary, however, since the polyglycerols contain both primary and secondary hydroxy groups there will be a certain amount of selectivity as to the position of the ester groups. Primary hydroxyl functions being more reactive than the secondary hydroxyl groups will preferentially react with the acid giving terminal ester groups, however, in all cases (even when only enough acid is present to react with two hydroxyl groups) mixtures will result since it is impossible to completely eliminate competing reactions. As the equivalents of acid are increased the number of ester groups pendant to the polyglycerol chain, as a result of reaction with secondary hydroxyl groups, will necessarily increase.

Polyglycerols useful for the preparation of the partial esters are intermolecular glycerol ethers formed by the condensation of two or more glycerol (glycerine) molecules accompanied by the elimination of water. Such condensation reactions are known to the art and any known process may be employed and will provide polyglycerols suitable for esterification in accordance with the present invention. The number of glycerol units condensed and the molecular weight distribution of the polyglycerols in the resulting product is primarily a function of the reaction time. Reaction rates are governed by the temperature at which the reaction is carried out. Polyglycerols obtained generally are mixtures containing some unreacted glycerol and a variety of polyglycerols having different degrees of polymerization. It is to be understood for the purposes of the present invention that when a specific polyglycerol is mentioned, e.g., triglycerol, this is not to be construed as indicative of a pure polyglycerol but only indicates that triglycerol is the major component present in the mixture. Unreacted glycerol and minor amounts of other polyglycerols having molecular weights higher and lower than triglycerol such as diglycerol, tetraglycerol, pentaglycerol and, in some cases, even higher molecular weight polyglycerol products are present in the mixture. The fact that a single glycerol condensation product is not employed does not affect the success of the subsequent esterification or the usefulness of the partial esters obtained therefrom, however, polyglycerols containing eight or more condensed glycerol units should not be present in amounts exceeding about 10% by weight of the total polyglycerol composition. Significant amounts of polyglycerols containing 10 or more condensed glycerol units should be avoided. Preferably, the polyglycerol is comprised of 65% or more by weight of polyglycerols containing from two to six glycerol units condensed. Unreacted glycerine present in the polyglycerol mixture should not exceed about 30% by weight of the overall composition. The desired physical characteristics of the partial ester and its ultimate usage will determine which polyglycerol or polyglycerol mixture will be employed.

The acids employed have the general formula R—COOH where R is a branched chain hydrocarbon radical containing about 11 to 23 carbon atoms. One or more of these branched chain monocarboxylic acids is esterified with the polyglycerol to obtain the polyglycerol partial esters of this invention. Especially useful for obtaining the polyglycerol esters of the present invention are acids having the formula

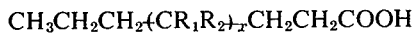

wherein $R_1$ and $R_2$ are, independently, hydrogen or a $C_1$-$C_3$ alkyl group but at least one alkyl branch is pendant to the bivalent radical within the parenthetical expression and $x$ is an integer so that the total number of carbon atoms within the parenthetical expression is not less than 6 or more than 12.

The monocarboxylic acids are saturated or essentially so. Unsaturated acids are subject to oxidative attack which contributes to the rancidity problem and are therefore undesirable. No more than 10% of the acids should be ethyleneically unsaturated and preferably these unsaturated acids will be less than 2% of the total. Preferred acids contain an average of about 18 carbon atoms. Typically $C_{18}$ acids comprise 75% or more of the total acid composition with the remaining acids being predominantly $C_{14}$, $C_{16}$ and $C_{20}$ acids. These acids are branched having one or more alkyl groups pendant to the main carbon skeleton. Preferably the branches are methyl groups present in the central portion of the acid molecule. The 3 carbon atoms at either end of the acid chain should be essentially free of branching. An especially useful acid for the present invention is isostearic acid which is a commercially available acid consisting of a complex mixture of $C_{18}$ acid isomers.

An especially preferred polyglycerol partial ester is triglycerol diisostearate obtained by the reaction of 1 mol triglycerol and 2 mols of isostearic acid. These ester compositions have utility as emulsifiers in cosmetic formulations and are especially useful as replacement for all or part of the castor oil in the formulation of lipsticks. The triglycerol diisostearate is an excellent solvent for dyes commonly used in lipsticks and when substituted for castor oil results in significant improvement in performance. Triglycerol diisostearate dissolves dye and wets pigment faster than castor oil. Dispersions obtained with triglycerol diisostearate are more stable than those prepared with castor oil. The triglycerol diisostearate will typically have an iodine value of less than about 2, a hydroxyl value between about 130 and 160 and an acid value less than about 10.

The following examples illustrate the invention more fully, however, they are not intended as a limitation on the scope thereof. All parts and percentages in these examples are on a weight basis unless otherwise indicated.

EXAMPLE I

Triglycerol was prepared in the following manner: 250 Parts glycerin was charged to a reactor with 2.5 parts sodium acetate catalyst. The mixture was heated at 260°C for about 2 hours with agitation under nitrogen atmosphere and about 35 parts water were collected using a condensing trap. A viscosity measurement on a sample taken after two hours indicated that the reaction mixture had a 210°F viscosity of 55 centistokes. The reaction was continued while taking samples at regular intervals until the 210°F viscosity reached about 65 centistokes. At this point the reaction mixture was cooled as quickly as possible to 90°–100°C and the nitrogen turned off. The triglycerol was stored at room temperature for subsequent use.

EXAMPLE II

240 Grams (1 mol) of the triglycerol prepared in Example I and 568 grams (2 mols) isostearic acid (Emery 875 Isostearic Acid) were combined in a 2-liter flask equipped with a mechanical stirrer, thermowatch, Dean-Stark trap and subsurface nitrogen inlet. The reaction mixture was heated at 210°C for about 4.5 hours during which time about 37 mls water were removed. The acid value of the reaction mixture at this point was negligible. The crude product was combined with activated carbon and heated at about 80°C for about 1 hour. This mixture was then filtered to remove the charcoal. The resulting light amber liquid had an acid value of 2.4 (A.O.C.S. Te 1a-64T) and an iodine value (Wijs Method) of 1.1. The triglycerol diisostearate had a titer (solidification point) of 4.7°C measured in accordance with A.O.C.S. Test Method Tr 1a-64T.

EXAMPLE III

A lipstick was prepared in the following manner: A dispersion of 1 part D & C Red No. 21 (tetrabromofluorescein) and 25 parts triglycerol diisostearate of Example II was prepared by heating the mixture at 70°C until the dye was dissolved and then adding two parts D & C Red No. 3 (Aluminum Lake) with milling until the pigment was thoroughly dispersed. This dispersion was then added to a homogeneous wax melt containing 10 parts carnauba wax, 10 parts candelilla wax, 8 parts lanolin, 9 parts petrolatum, 4 parts stearic acid and 24 parts isopropyl myristate. Finally a paste comprised of 25 parts triglycerol diisostearate and 15 parts pearl pigment with a small amount of perfume was dispersed in the melted lipstick composition and the entire mixture heated to about 90°C with slow stirring until all visible air was out of the mixture. The hot mixture was poured into molds and allowed to cool. Lipsticks prepared in this manner had a uniform appearance and demonstrated good thixotropy. These lipsticks applied smoothly and evenly with a minimum amount of pressure exhibiting good "grab" and "payoff". Even thin films of the lipstick imparted good color and were resistant to mild abrasion. Upon application the color obtained with the triglycerol diisostearate formulation was more desirable, i.e., had an improved hue or brilliance, compared to a lipstick prepared in the same manner using castor oil. The product had excellent oxidative stability and showed no signs of rancidity after prolonged storage.

EXAMPLE IV

The following ingredients were used in a lipstick formulation:

35 Parts triglycerol diisostearate
15 Parts beeswax
1 Part D & C Red No. 21

The triglycerol diisostearate and beeswax were heated at about 80°C to obtain a uniform melt and the dye added thereto with gentle agitation. The mixture was then poured into molds and allowed to cool. Lipsticks prepared in accordance with this formulation had good appearance in the stick after application. When castor oil was substituted for the triglycerol diisostearate in the above formulation it was observed that the color of the resulting lipstick was less attractive upon application. The color of the lipstick compositions containing the triglycerol diisostearate was significantly improved - imparting a livelier and brighter color.

EXAMPLE V

As a further demonstration of the advantages of the compounds of the present invention a comparison of the ability to dissolve dyes was made with castor oil and triglycerol diisostearate. Dye tablets containing about 0.25 grams D & C Red No. 21 were prepared in a tablet mold at 1500 psi. The dye tablet was then placed in a beaker containing 100 grams of the oil and moderately agitated for 24 hours maintaining a temperature of 60°-70°C. The weight loss of the tablet was recorded at the end of the 24-hour period to determine the amount of dye dissolved in the oil. Test results were as follows:

| TRIGLYCEROL DIISOSTEARATE: | RUN 1 | RUN 2 |
| --- | --- | --- |
| Initial Weight of Tablet | 0.250 | 0.250 |
| Final Weight of Tablet | 0.190 | 0.170 |
| Percent of Dye Dissolved | 24 | 32 |
| CASTOR OIL: | | |
| Initial Weight of Tablet | 0.247 | 0.260 |
| Final Weight of Tablet | 0.242 | 0.247 |
| Percent of Dye Dissolved | 2 | 5 |

The above data clearly demonstrates that the D & C Red No. 21 is more easily dissolved in the triglycerol diisostearate than in castor oil. Similar results were obtained with other dyes typically used in lipstick formulations. At 70°C the solubility of D & C Red No. 21 was 1.91% in triglycerol diisostearate whereas it was only 1.47% in castor oil.

In addition to the improved ability of the triglycerol diisostearate to dissolve the dye it was observed that dispersions of pigments with triglycerol diisostearate showed less tendency to separate than dispersions prepared with castor oil. To demonstrate this feature 50 grams of these oils containing 4 grams D & C Red No. 21 were placed in mill jars with Borundum cylinders and milled for 24 hours. The resulting dispersions were then poured into glass cylinders and allowed to stand at room temperature. The amount of settling was measured for each sample at regular intervals. Less settling was obtained with the triglycerol diisostearate. After standing for several months the improvement obtained with the dispersions prepared with triglycerol diiostearate was even more pronounced.

EXAMPLE VI

Triglycerol diisostearate was employed to prepare a lipstick in accordance with the following recipe:

Wax Phase 17.5 Parts synthetic beeswax substitute (Emerwax 417D)
2 Parts lanolin
5 Parts D & C Red No. 21 (Aluminum Lake)
4.5 Parts glycerol monostearate

Oil Phase 17.5 Parts triglycerol diisostearate
1 Part D & C Red No. 21

The oil phase was heated at approxiately 70°C to dissolve the dye. The melted wax phase with the pigment dispersed therein was then added to the hot oil phase with mixing and the mixture poured into molds and cooled. Excellent lipsticks were obtained which had a brilliant color and intensity and which showed no signs of rancidity after prolonged aging.

When other polyglycerol partial esters are prepared including those derived from higher polyglycerols and other branched chain acids similar results are obtained. Also it is possible to widely vary the number of ester groups on the various polyglycerols by simply changing the molar quantities of the reactants employed. When higher molecular weight polyglycerols are used the viscosity of the resulting polyglycerol partial ester will be increased. This feature may be useful in formulating lipsticks where increased viscosity is required. Similarly much variation is possible as to the degree of ester groups present on the molecule — particularly when the higher polyglycerols are employed. This makes it possible to vary the hydrophilic and lipophilic properties of the resulting product. In general, as the number of free hydroxyl groups on the polyglycerol partial ester is reduced the hydrophilicity will decrease and lipophilicity will be increased. This feature may be used to advantage in the formulation of lipsticks and wide variation in the properties of the lipstick is possible by varying the particular polyglycerol partial ester used and other lipstick ingredients.

In general, lipsticks having improved properties obtained in accordance with the present invention contain from about 2 to about 20% by weight of a coloring agent and about 80 to 98% by weight of a base formulation consisting of an oil phase and a wax phase. The oil and wax portions may each constitute from about 10 to 70% by weight of total composition, and more preferably, each will range between about 20 to 60% by weight of the lipstick. Any number of ingredients may be employed in the makeup of the base formulation of the lipsticks. The polyglycerol partial esters of this invention will constitute all or part of the oil phase and will be present in amounts up to about 70% by weight of the lipstick. More preferably they will constitute from about 5 to about 60% by weight of the total lipstick composition. The polyglycerol partial esters may be the sole ingredient in the oil phase or it may be employed in conjunction with other oils depending on the properties being sought.

Preferred lipstick compositions contain about 2 to 15% of the coloring agent. Any known coloring agents, including staining dyes and pigments, are suitable for use in formulating the lipsticks of this invention. Suitable staining dyes include:

4,5-dibromo-3,6-fluorandiol (D & C Orange No. 5);
2,4,5,7-tetrabromo-12,13,14,15-tetrachloro-3,6-florandiol (D & C Red No. 27);
4,5-dichloro-3,6-florandiol (D & C Orange No. 8);
2,4,5,7-tetrabromo-3,6-fluorandiol (D & C Red No. 21);
4,5,15-tribromo-2,7-dicarboxy-3,6-fluorandiol (D & C Orange No. 14);
dichlorofluorescein (D & C Orange No. 8);
diiodofluorescein (D & C Orange No. 10);
dibromodiiodofluorescein (D & C Orange No. 16);
tetrachlorofluorescein (D & C Red No. 24);
1,4,5,8,15-pentabromo-2,7-dicarboxy-3,6-fluorandiol (D & C Red No. 29);

and the like. Pigments, both inorganic and organic, and lakes are also employed. These include aluminum oxide, titanium oxide, zinc oxide, iron oxide, talc, kaolin, clay, bentonite, aluminum lakes such as D & C Red No. 1, D & C Red No. 2, D & C Red No. 3, D & C Red No. 5, D & C Red No. 21, D & C Orange No. 1, D & C Orange No. 4, D & C Orange No. 15, barium and calcium lakes such as D & C Red No. 7, D & C Red No. 11, D & C Red No. 12, D & C Red No. 31, D & C Red No. 34, the strontium lake of lithol red (D & C Red No. 13), the aluminum and benzoate lake of rhodamine (D & C Red No. 19), and the like. Other certified reds and oranges which are sufficiently insoluble in water and oils may be used as lipstick pigments without being converted to metallic lakes. These include D & C Red No. 35, D & C Red No. 36, D & C Red No. 38 and D & C Orange No. 17.

While not essential for the preparation of a useful lipstick, flavors and perfumes may be incorporated therein. Flavors and perfumes such as strawberry, raspberry, vanillin, orange blossom, jasmin, rose, rose otto, heliotropin, benzyl propionate, linalyl cinnamate, essential perfume oils, and the like may be included in the formulation in amounts up to about 2% by weight, if desired.

The wax portion of the lipstick base serves as a binder, strengthens the stick, gives it body and raises the melting point. Suitable waxes for this purpose include beeswax, carnauba wax, candelilla wax, paraffin wax, ozokerite, ceresin, cocoa butter, spermaceti, hydrogenated castor oil and hydrogenated palm kernel oil, montan wax, microcrystalline waxes and various synthetic waxes such as silicone waxes and the like which serve as substitutes for the above-mentioned natural and modified-natural waxes.

Oils which may be employed in combination with the polyglycerol partial esters include castor oil, vegetable oil, mineral oils, liquid paraffin fractions, tetrahydrofurfuryl alcohols and esters thereof, polyalkylene glycols and their ethers, propylene glycol esters such as propylene glycol monolaurate and propylene glycol monostearate, fatty esters of lower alcohols such as isopropyl myristate, glycerol monostearate and the like, cetyl alcohol, lanolin, petrolatum, vegetable oils and hydrogenated vegetable oils, cocoa butter, lard and the like. These oils in addition to solubilizing the dyes may also serve one or more other useful functions in the lipstick such as improve the consistency of the stick or to impart gloss or sheen to the lips.

The polyglycerol partial esters of this invention are compatible with any of the above-mentioned materials and other compounds known and used for formulating lipsticks and the formulations may be widely varied depending on the characteristics desired in the finished lipstick. Variations in hardness, ease of application, melting point, thixotropic properties, gloss, color and other properties can be achieved by modifying the formulation and the amount of the specific ingredients employed.

We claim:

1. A partial ester of a polyglycerol with a branched chain aliphatic acid having the formula

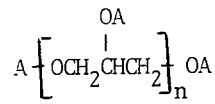

wherein $n$ is an integer from 2 to about 6 and A is a hydrogen or an acyl group of the formula

where R is a branched chain hydrocarbon group having from 13 to 17 carbon atoms, said partial ester having at least 40% of the hydroxyl groups of the polyglycerol unesterified.

2. The polyglycerol partial ester of claim 1 wherein the branched chain hydrocarbon group has 17 carbon atoms and is derived from isostearic acid.

3. The polyglycerol partial ester of claim 1 wherein R is a branched chain saturated hydrocarbon group derived from an acid of the formula

wherein $R_1$ and $R_2$ are selected from the group consisting of hydrogen and $C_1$–$C_3$ alkyl groups, $x$ is an integer so that the total number of carbon atoms within the parenthetical expression is not less than 6 or more than 12, and the bivalent group within the parenthetical expression is substituted with at least one alkyl group.

4. The polyglycerol partial ester of claim 3 wherein the acids have an average of about 18 carbon atoms.

5. The polyglycerol partial ester of claim 4 which is triglycerol diisostearate.

* * * * *